(12) United States Patent
Cao

(10) Patent No.: US 8,073,507 B2
(45) Date of Patent: Dec. 6, 2011

(54) COMMUNICATION DEVICE

(75) Inventor: Xiang Cao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/889,545

(22) Filed: Sep. 24, 2010

(65) Prior Publication Data

US 2011/0255223 A1  Oct. 20, 2011

(30) Foreign Application Priority Data

Apr. 16, 2010  (CN) .......................... 2010 1 0149001

(51) Int. Cl.
*H04W 88/02* (2009.01)

(52) U.S. Cl. .................................................... 455/575.3
(58) Field of Classification Search ..... 455/575.1–575.8
See application file for complete search history.

(56) References Cited

U.S. PATENT DOCUMENTS

| 7,632,023 | B2 * | 12/2009 | Misawa ........................ 396/348 |
| 2011/0112524 | A1 * | 5/2011 | Stern et al. ..................... 606/33 |

* cited by examiner

*Primary Examiner* — Diane Mizrahi
(74) *Attorney, Agent, or Firm* — Altis Law Group, Inc.

(57) ABSTRACT

A communication device includes a base body, a display located on the base body, and a host removably secured to the base body. A microphone and a speaker are located on the host. The host is movable between a first state, where the host is electronically connected to the display for providing power to the display, and a second state, where the host is removed from the base body.

15 Claims, 5 Drawing Sheets

COMMUNICATION DEVICE

BACKGROUND

1. Technical Field

The present disclosure relates to a communication device.

2. Description of Related Art

For mobile devices, more functionality and better video output/display are desired by many users. However these features put a drain on the battery of the user device. Thus battery life is of very importance when considering these desires. Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
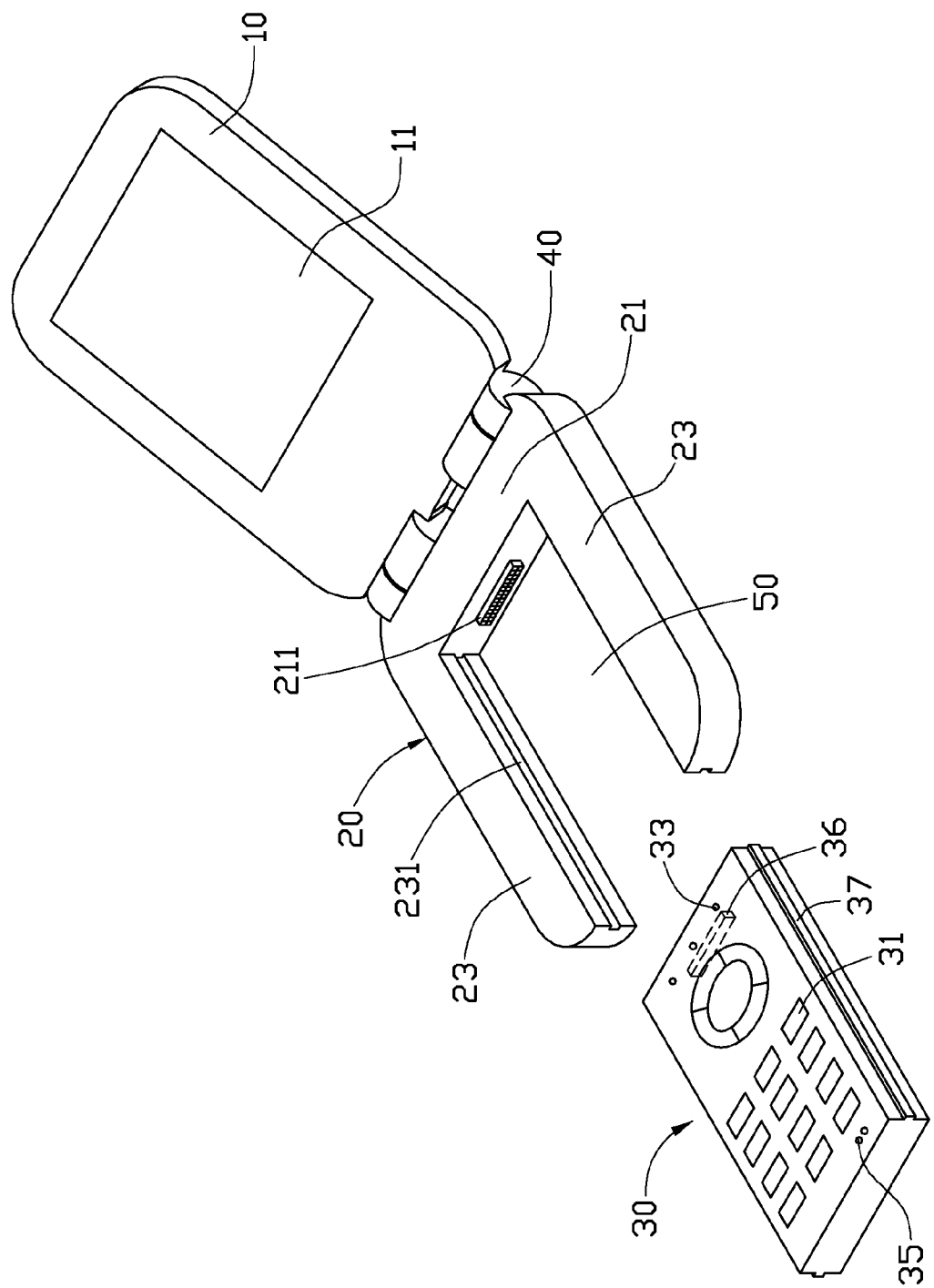
FIG. 1 is an exploded view of a communication device in accordance with an embodiment.
Figure 2:
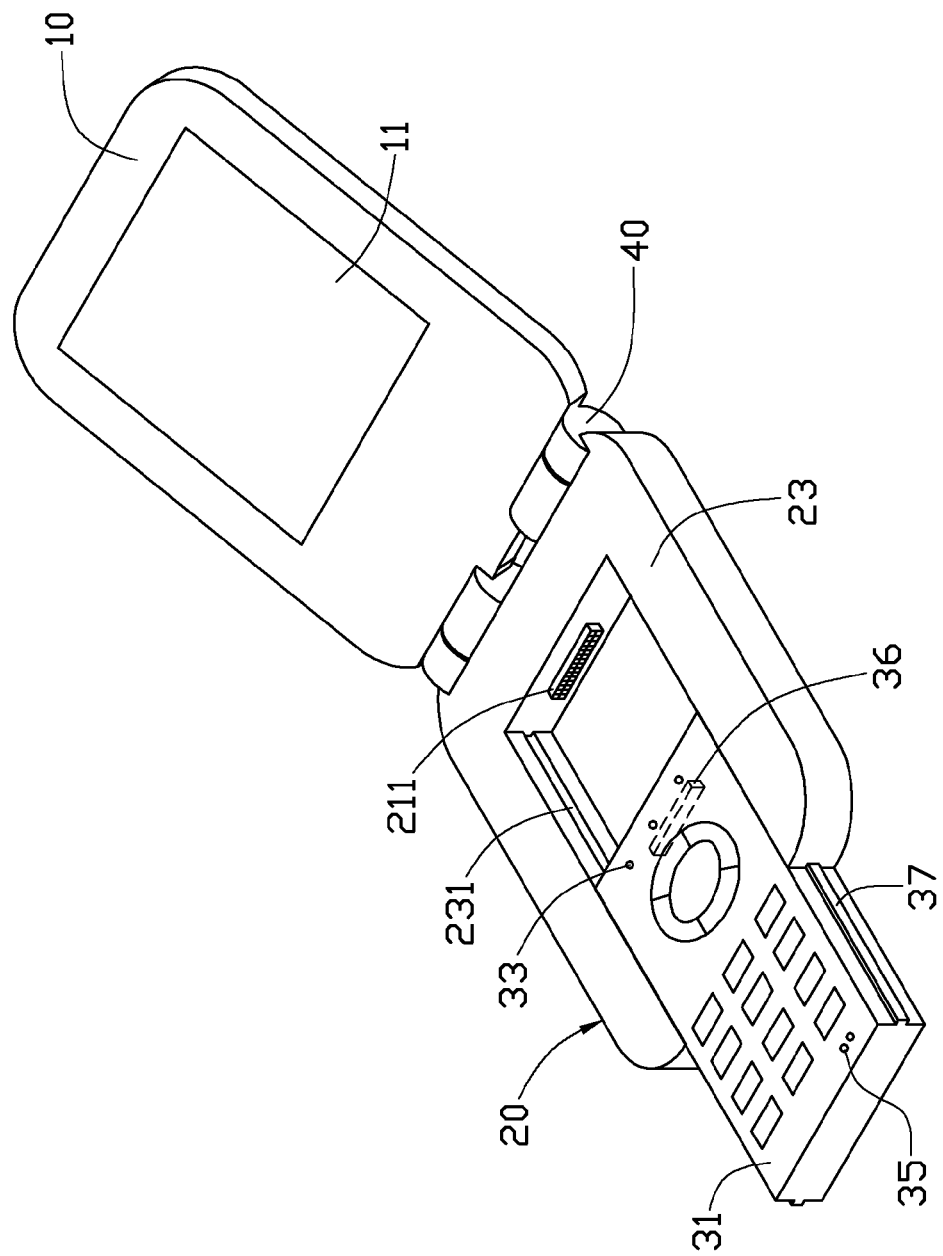
FIG. 2 is an assembled view of the communication device of FIG. 1, showing a host in a first state.

Referring to FIGS. 1-2, a communication device includes a base body 20, a display 10, and a host 30. In one embodiment, the communication device may be a mobile phone, or a personal digital assistant.

The base body 20 includes two extending portions 23 and a connecting portion 21 positioned between the two extending portions 23. A receiving space 50 is defined in the base body 20 among the two extending portions 23 and the connecting portion 21. A guiding slot 231 is defined in each extending portion 23 in the receiving space 50. A first connector 211 is located on the connecting portion 21 in the receiving space 50 and electronically connected with the display 10.

The display 10 is rotatably secured to the host 30 with a hinge 40. A screen 11 is located on the display 10. The display 10 can be rotated between a first location and a second location. In the first location, the screen 11 is substantially adjacent to the base body 20, and in the second location, the screen 11 is away from the base body 20.

The host 30 is capable of directly making a telephone call and receiving a phone call. A number of buttons 31 is located on a top surface of the host 30, for inputting information, such as numbers, letters, or characters that can be shown on the screen 11 of the display 10. A speaker 33 is located on the host 30 adjacent a rear side. A second connector 36 is located on the rear side, for engaging with the first connector 211. A microphone 35 is located on the host 30 adjacent a front side. Two rails 37 are located on the left and right sides of the host 30, for slidably engaging in the guiding slots 231.

Referring to FIGS. 1-2, the host 30 can slide between a first position (shown in FIG. 3) and a second position (shown in FIG. 1). In the first position, the second connector 33 engages with the first connector 211. In the second position, the second connector 33 is disengaged from the first connector 211, and the host 30 is removed from the receiving space 50 of the base body 20.

Figure 3:
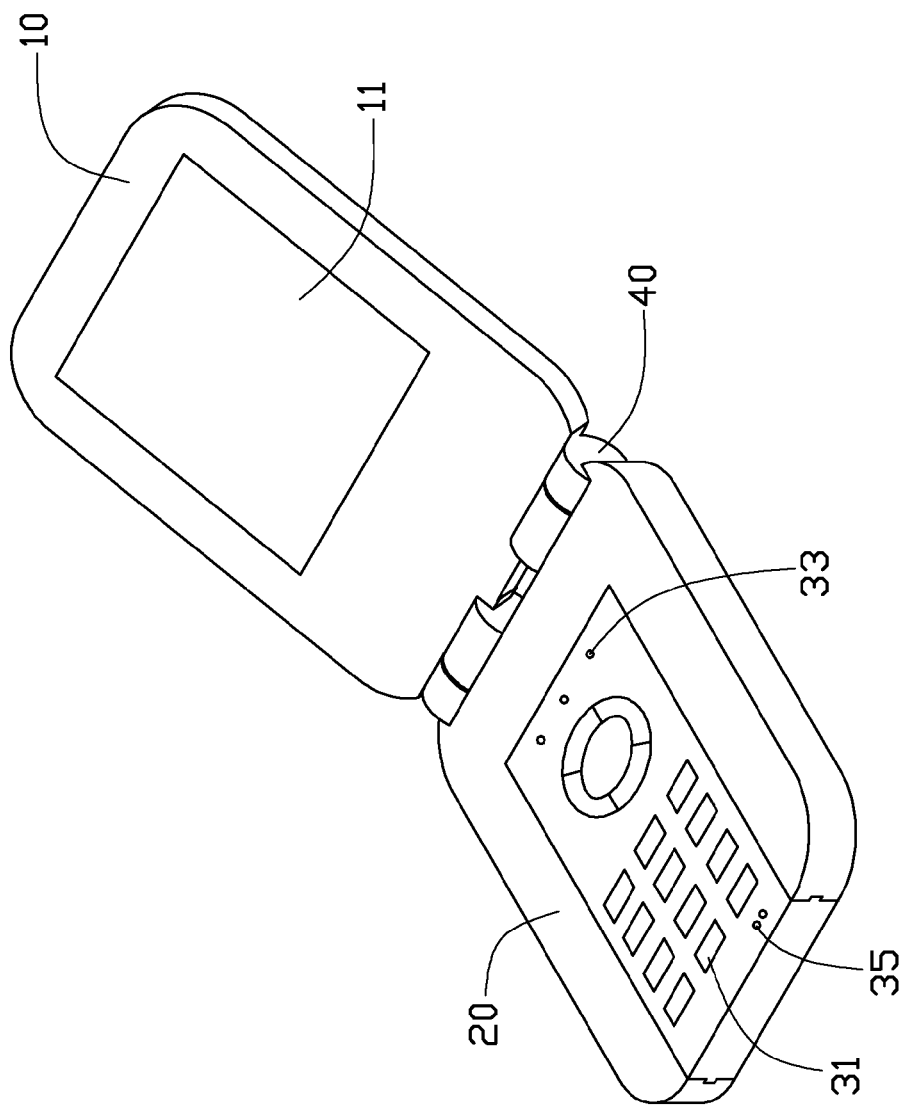
FIG. 3 is similar to FIG. 2, but shows the host in a second state.

Referring to FIGS. 1-3, in assembly, the host 30 is inserted in the receiving space 50, and the rails 37 are inserted into the guiding slots 321. The host 30 is slid towards the first connector 211 of the base body 20, until the host 30 is in the first position. Thus, the host 30 is secured to the base body 20 in the receiving space 50, and the display 10 is electronically connected to the host 30 by the first and second connectors 211 and 33. The host 20 is covered by the display 10 when the display 10 is in the first location and away from the display 10 when the display 10 is in the second location.

In disassembly, the second connector 36 is disengaged from the first connector 211, and the host 30 is slid from the first position to the second position. Thus, the host 30 can be removed from the base body 20.

Figure 5:
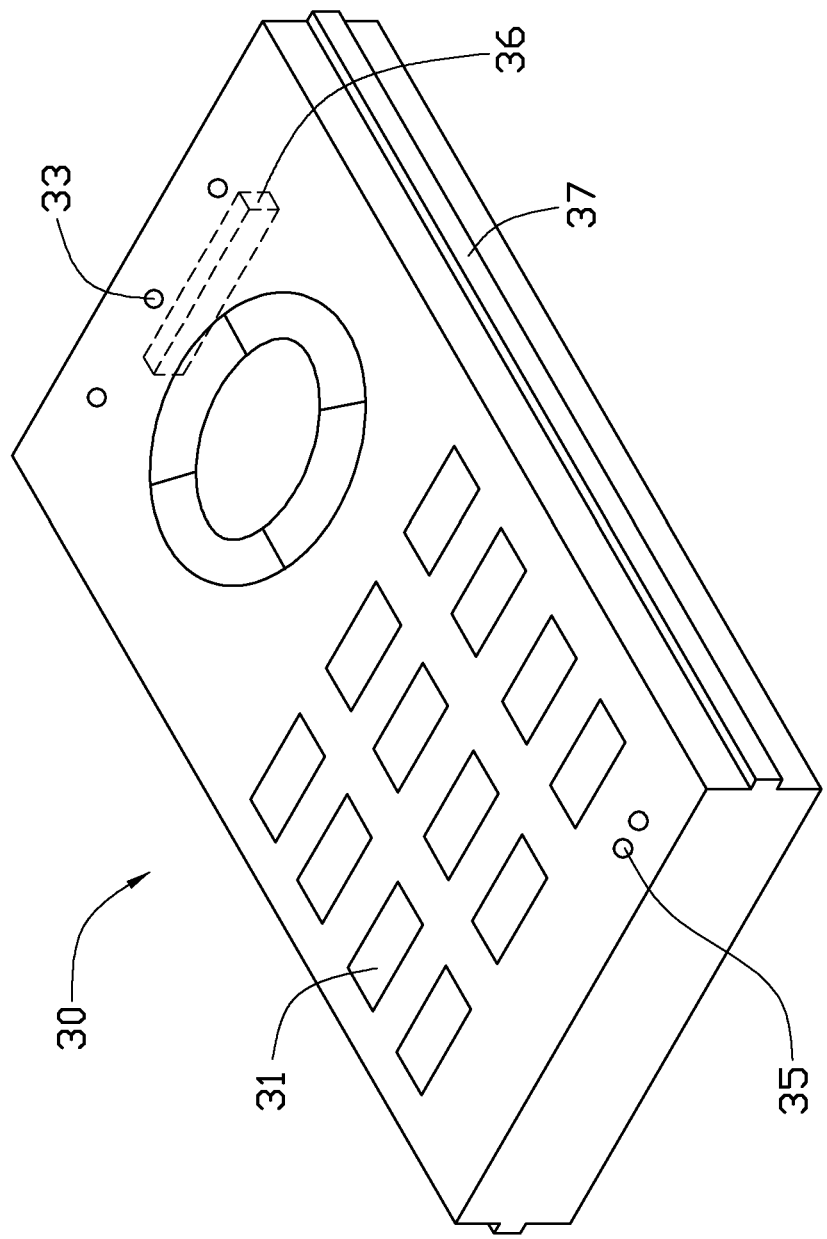
FIG. 5 is an isometric view of the host of FIG. 1.

Referring to FIG. 5, in use, when the power of the host 20 is not sufficient for a call, the host 30 is removed from the base body 20. Therefore, the host 30 no longer provides power to the display 10, and the power can be conserved for an extra long telephone call.

Figure 4:
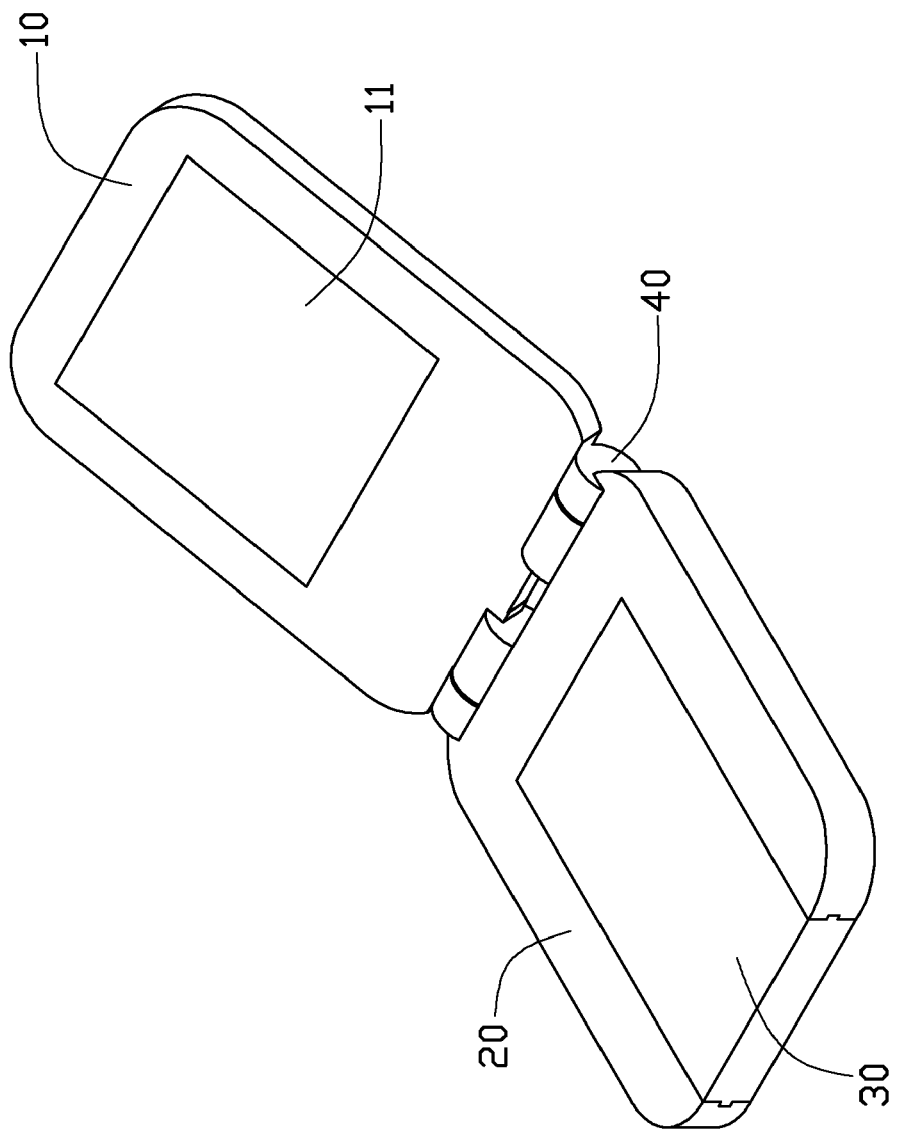
FIG. 4 is similar to FIG. 3, but shows the host in a third state.

The host 30 can be secured to the base body 20 in a first state (shown in FIG. 3) and a second state (shown in FIG. 4). In the first state, which is the same as the host 30 being in the first position, the buttons 31 are located on a top side of the base body 20, and substantially adjacent to the display 10 when the display 10 is rotated to the first location. In the second state, wherein the host 30 is in the first position but flipped around, the buttons 31 are located on a bottom side of the base body 20, and substantially away from the display 10 when the display 10 is rotated to the first location or the second location.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A communication device comprising:
    a base body;
    a display located on the base body; and
    a host removably secured to the base body, a microphone and a speaker located on the host;
    wherein the host is movable between a first position, where the host is electronically connected to the base body for providing power to the display, and a second position, where the host is removed from the base body.

2. The communication device of claim 1, wherein the display is rotatably secured to the base body.

3. The communication device of claim 2, wherein a hinge is connected between the base body and the display.

4. The communication device of claim 1, wherein a number of buttons are located on a top surface of the host; and when the host is in the first position and the number of buttons faces the display the host is in a first state.

5. The communication device of claim 1, wherein a number of buttons are located on a top surface of the host; and when the host is in the first position and the number of buttons are facing away from the display the host is in a second state.

6. The communication device of claim 1, wherein the base body defines a receiving space and two guiding slots; two rails are located on the host; and the host is received in the receiving space, and the two rails are engaged into the two guiding slots when the host is in the first position.

7. The communication device of claim 1, wherein a first connector is located on the base body; a second connector is located on the host; and the first connector is electronically engaged with the second connector when the host is in the first position, and disengaged from the second connector when the host is in the second position.

8. A communication device comprising:
a base body;
a display rotatably secure to the base body; and
a host removably secured to the base body, the host capable of communicating with another communication device;
wherein the display is rotatable between a first location, where the host is covered by the display, and a second location, where the display is away from the host.

9. The communication device of claim 8, wherein a hinge is connected between the base body and the display.

10. The communication device of claim 8, wherein a number of buttons is located on the host; and the number of buttons is substantially adjacent to the display when the display is in the first location, and away from the display when the display is in the second location.

11. The communication device of claim 10, wherein the number of buttons is located on a top side of the base body.

12. The communication device of claim 8, wherein a number of buttons is located on the host; and the number of buttons is away from display when the display is the first or second location.

13. The communication device of claim 12, wherein the number of buttons is located on a bottom side of the base body.

14. The communication device of claim 8, wherein the base body defines a receiving space and two guiding slots; two rails are located on the host; and the host is received in the receiving space, and the two rails are engaged into the two guiding slots.

15. The communication device of claim 8, wherein a microphone and a speaker are located on the host.

\* \* \* \* \*